United States Patent
Bennett et al.

(10) Patent No.: US 9,920,544 B1
(45) Date of Patent: Mar. 20, 2018

(54) PLUNGER WAVE GENERATOR APPARATUS FOR EFFICIENTLY PRODUCING WAVES IN A BODY OF WATER

(71) Applicants: Walter Judson Bennett, Mechanicsville, VA (US); Matthew Gunn, Queens Creek, AZ (US); John Bushey, Eden Prairie, MN (US)

(72) Inventors: Walter Judson Bennett, Mechanicsville, VA (US); Matthew Gunn, Queens Creek, AZ (US); John Bushey, Eden Prairie, MN (US)

( * ) Notice: Subject to any disclaimer, the term of this patent is extended or adjusted under 35 U.S.C. 154(b) by 5 days.

(21) Appl. No.: 15/362,939

(22) Filed: Nov. 29, 2016

(51) Int. Cl.
| | |
|---|---|
| E02B 9/00 | (2006.01) |
| E02B 9/08 | (2006.01) |
| E02B 3/00 | (2006.01) |
| E02B 5/08 | (2006.01) |
| E02B 7/00 | (2006.01) |
| E04H 4/00 | (2006.01) |

(52) U.S. Cl.
CPC .................. *E04H 4/0006* (2013.01)

(58) Field of Classification Search
CPC ..... E02B 9/00; E02B 9/08; E02B 3/00; E02B 5/08; E02B 7/00; F03B 13/14; F03B 13/26; A63B 69/0093; A63B 69/125
USPC ......................................... 405/79, 75, 76, 80
See application file for complete search history.

(56) References Cited

U.S. PATENT DOCUMENTS

| | | | | | |
|---|---|---|---|---|---|
| 2,908,141 | A | * | 10/1959 | Marsh, Jr. | B63B 21/502 114/264 |
| 3,191,386 | A | * | 6/1965 | Wiegel | E02B 3/06 405/25 |
| 3,299,846 | A | * | 1/1967 | Jarlan | B63B 35/4413 114/264 |
| 3,350,724 | A | * | 11/1967 | Leigh | E04H 4/0006 4/491 |
| 3,373,568 | A | * | 3/1968 | Hornbostel, Jr. | E02B 3/04 405/115 |
| 3,431,879 | A | * | 3/1969 | Westling | B63B 21/26 114/294 |
| 3,472,032 | A | * | 10/1969 | Howard | E21B 43/01 114/264 |

(Continued)

FOREIGN PATENT DOCUMENTS

| | | |
|---|---|---|
| EP | 0236653 A1 | 9/1987 |
| EP | 0732468 A1 | 9/1996 |

(Continued)

*Primary Examiner* — Benjamin F Fiorello
*Assistant Examiner* — Edwin J Toledo-Duran

(57) ABSTRACT

An apparatus for creating a surfing wave in a body of water. An apparatus for the purpose of efficiently producing a variety of surfing waves having a repetition rate and size suitable for surfing. The waves are generated using a controlled up and down motion of mechanical plungers in a way that allows the control of the shape and therefore surf characteristics of the wave. A linear array of plungers is used so that they interact in different ways with bathometry of the body of water and can be changed to further alter the surfing characteristics of the waves. The motion of the individual plungers can be adjusted so that effects of different wave travel distance to the bathometry can be compensated for consistent wave characteristics.

13 Claims, 7 Drawing Sheets

(56) References Cited

U.S. PATENT DOCUMENTS

| | | | | |
|---|---|---|---|---|
| 3,487,228 A * | 12/1969 | Kriegel | F03B 13/187 | 290/52 |
| 3,487,645 A * | 1/1970 | Frankel | E02B 3/062 | 405/26 |
| 3,557,559 A * | 1/1971 | Barr | E04H 4/0006 | 4/491 |
| 3,789,612 A * | 2/1974 | Richard | E04H 4/0006 | 4/491 |
| 3,817,040 A * | 6/1974 | Stevens | E02D 7/24 | 114/295 |
| 3,927,330 A * | 12/1975 | Skorupinski | F03B 17/066 | 290/54 |
| 3,973,405 A * | 8/1976 | Duport | E02B 1/02 | 4/491 |
| 3,986,471 A * | 10/1976 | Haselton | B63B 35/4413 | 114/122 |
| 4,062,192 A * | 12/1977 | Biewer | E04H 4/0006 | 4/491 |
| 4,078,871 A * | 3/1978 | Perkins, Jr. | F03B 13/147 | 290/53 |
| 4,098,084 A * | 7/1978 | Cockerell | F03B 13/20 | 417/332 |
| 4,210,821 A * | 7/1980 | Cockerell | F03B 13/20 | 290/53 |
| 4,276,664 A * | 7/1981 | Baker | E04H 4/0006 | 4/491 |
| 4,434,375 A * | 2/1984 | Taylor | F03B 13/1885 | 290/53 |
| 4,507,018 A * | 3/1985 | Andersen | E02B 3/00 | 4/491 |
| 4,539,719 A * | 9/1985 | Schuster | E04H 4/0006 | 4/491 |
| 4,627,240 A * | 12/1986 | Holmes | F03B 13/1845 | 290/53 |
| 4,684,815 A * | 8/1987 | Gargos | F03B 13/20 | 290/42 |
| 4,686,377 A * | 8/1987 | Gargos | F03B 13/20 | 290/42 |
| 4,698,969 A * | 10/1987 | Raichlen | F03B 13/187 | 210/121 |
| 4,705,428 A * | 11/1987 | Andersen | E04H 4/0006 | 4/491 |
| 4,773,221 A * | 9/1988 | Noren | F03B 13/187 | 60/497 |
| 4,783,860 A * | 11/1988 | Funke | E04H 4/0006 | 4/491 |
| 4,810,129 A * | 3/1989 | Guevel | E04H 4/0006 | 4/491 |
| 4,976,570 A * | 12/1990 | Davis | F04D 35/00 | 4/491 |
| 5,171,101 A * | 12/1992 | Sauerbier | A63B 69/0093 | 405/52 |
| 5,320,449 A * | 6/1994 | Demarteau | E04H 4/0006 | 4/491 |
| 5,342,145 A * | 8/1994 | Cohen | E04H 4/0006 | 4/491 |
| 5,347,145 A * | 9/1994 | Tanaka | G01R 31/2884 | 257/203 |
| 5,564,859 A * | 10/1996 | Lochtefeld | A63B 69/0093 | 405/52 |
| 5,621,925 A * | 4/1997 | Bastenhof | E04H 4/0006 | 4/491 |
| 6,164,870 A * | 12/2000 | Baruh | E02B 3/108 | 405/114 |
| 6,217,256 B1 * | 4/2001 | Inan | E04H 4/0006 | 4/491 |
| 6,716,107 B2 * | 4/2004 | Lochtefeld | A63B 69/0093 | 472/117 |
| 2007/0081861 A1 * | 4/2007 | Goble | E02B 9/08 | 405/79 |
| 2008/0018114 A1 * | 1/2008 | Weldon | F03B 13/181 | 290/53 |

FOREIGN PATENT DOCUMENTS

| | | |
|---|---|---|
| WO | WO1991014062 A1 | 9/1991 |
| WO | WO2015082871 | 6/2015 |
| WO | WO2015188219 A1 | 12/2015 |

* cited by examiner

PLUNGER WAVE GENERATOR APPARATUS FOR EFFICIENTLY PRODUCING WAVES IN A BODY OF WATER

PATENT CITATIONS

U.S. Pat. No. 4,062,192 * Feb. 18, 1975 Dec. 13, 1977 Offshore Technology Corporation Method of and mechanism for generating waves suitable for surfing U.S. Pat. No. 4,539,719 * Feb. 8, 1984 Sep. 10, 1985 Automated Swimpools, Inc. Pneumatic surf wave production for pools U.S. Pat. No. 5,342,145 * Apr. 21, 1993 Aug. 30, 1994 Cohen Albert D System for producing surfing waves for tube riding or wind surfing US20070081861 * Sep. 26, 2006 Apr. 12, 2007, Goble Rowland H Wave generator U.S. Pat. No. 4,976,570 A, May 15, 1986, Dec. 11, 1990, Walter R. Davis, Todd H. Nahrup, Apparatus and method for generating waves in a body of water.

U.S. Pat. No. 6,716,107 B2, Nov. 16, 2001, Apr. 6, 2004, Thomas J. Lochtefeld, Containerless sheet flow water ride.

U.S. Pat. No. 5,564,859 A, Feb. 23, 1995, Oct. 15, 1996, Thomas J. Lochtefeld, Method and apparatus for improving sheet flow water rides.

U.S. Pat. No. 5,171,101 A, Nov. 15, 1991, Dec. 15, 1992, Charles E. Sauerbier, Thomas J. Lochtefeld, Surfing-wave generators.

U.S. Pat. No. 4,976,570 A, May 15, 1986, Dec. 11, 1990, Walter R. Davis, Todd H. Nahrup, Apparatus and method for generating waves in a body of water.

WO2015082871 A1, Jun. 11, 2015, John Baxendale

WO2015188219A1 * Jun. 9, 2015 Dec. 17, 2015 Provision Unlimited Pty Ltd Surfing wave generation U.S. Pat. No. 3,789,612 * 27. März 1972 5. Feb. 1974 Richard E Method of surf generation U.S. Pat. No. 3,973,405 * 30. Oct. 1975 10. Aug. 1976 Societe Generale De Constructions Electriques Et Mecaniques (Alsthom) Surge generators of the plunger type U.S. Pat. No. 4,507,018 * 24. Jun. 1982 26. Mar. 1985 Andersen Per F Wave making machines U.S. Pat. No. 4,705,428 * 7. Mar. 1986 10. Nov. 1987 Andersen Per F Wave generating apparatus U.S. Pat. No. 4,276,664 * 30. Jan. 1979 7. Jul. 1981 Baker William H Apparatus for wave-making U.S. Pat. No. 4,810,129 1. Jun. 1987 7. Mar. 1989 Principia Recherche Developpement S.A. Arrangement for generating waves in a body of water U.S. Pat. No. 5,320,449 15. Mar. 1991 14. Jun. 1994 S. A. Wow Company Device designed to create a movement in a liquid especially at its surface.

U.S. Pat. No. 5,621,925 3. Mar. 1995 22. Apr. 1997 Bastenhof; Dirk Pool or water tank, such as a swimming pool, provided with means generating waves.

EP0236653A1 1. Dec. 1986 16. Sep. 1987 Principia Recherche Developpement Sa Wave generator EP0732468A1 3. Mar. 1995 18. Sep. 1996 Dirk Bastenhof Pool or water tank, such as a swimming pool, provided with means for generating waves WO1991014062A1 15. Mar. 1991 19. Sep. 1991 S. A. Wow Company Device designed to create a movement in a liquid, especially at its surface U.S. Pat. No. 6,217,256B1 * 1997-04-03 2001-04-17 Mehmet Zahit Inan Wave machine for liquids U.S. Pat. No. 4,783,860 * May 26, 1987 Nov. 15, 1988 Canadian Patents And Development Limited Combined flapper and piston motion wave board module U.S. Pat. No. 4,976,570 May 15, 1986 Dec. 11, 1990 Water Parks, Inc. Apparatus and method for generating waves in a body of water U.S. Pat. No. 5,342,145 Apr. 21, 1993 Aug. 30, 1994 Cohen Albert D System for producing surfing waves for tube riding or wind surfing U.S. Pat. No. 3,557,559 * May 12, 1969 Jan. 26, 1971 Barr Douglas W Wave-generating apparatus

FIELD OF THE INVENTION

This invention relates generally to a plunger wave generating apparatus for efficiently producing non-turbulent waves in a body of water. The apparatus is assembled from a plurality of the plungers to generate waves in a body of water. The wave making apparatus is for use in the field of recreational surfing and generates waves in a body of water either in isolation or with a high repetition rate and which are of a size and repetition rate that are suitable for surfing. The plunger wave making apparatus is assembled from a plurality of the plungers side by side vertically at ideally a 45 degree angle to generate waves in a body of water. The plunger wave making system produces a swell or wave crests which then transverses toward the beach area in the body of water.

BACKGROUND OF THE INVENTION

Wave Pools often use conventional wave generators to produce waves. These conventional Wave Pool wave generators are most commonly pneumatic, vacuum; drop water system or are plows towed through the water to create a surfing wave.

Waves that are generated artificially for surfing or recreation in a body of water known as a Surf-Pool must meet a number of criteria:

1. They must be of sufficient size and preferably exceed one meter in height. (3.28 feet).

2. They must travel at their natural velocity from the wave-making apparatus towards a sloping or contoured beach where they may break and dissipate their energy without being reflected.

3. For the installation to be economically viable, they must be produced at a high repetition rate, preferably in excess of 180 surfable rides per hour.

4. The waves should be essentially monochromatic, i.e. of a single frequency and without any significant smaller intermediate waves or harmonics or parasitic waves.

1. Waves should begin with a trough followed by a wave crest.

2. Waves should have 'laminar flow' characteristics as opposed to 'turbulent flow'.

There are a variety of different wave generators that are used to produce artificial waves in surf pools and wave pools. One conventional wave generator is the pneumatic surf wave or also called a Vacuum Wave Generator. The pneumatic surf wave stores water in cement caissons and uses the water weight to produce the desired wave. The pneumatic surf wave uses gravity to discharge the water from the caissons. The pneumatic surf wave uses a fan to expel the air in the chamber, causing a vacuum to draw the air upward. When the air is at its maximum capacity, the air is released into the chamber to create the wave. The caissons of the pneumatic surf wave are generally positioned upright.

Wave pools, surf pools and water rides often use conventional wave generators to produce waves. The design of the pool is very important for producing waves. If the design of the pool is flawed, the pool will not produce waves. Even in nature with the correct beach, perfect waves are rare, because the waves depend upon environmental conditions, such as tides, wind, and direction of off-shore storms.

By controlling the bottom profile of the wave-pool, or the direction of the waves, or a combination of both, the waves should be caused to break or peel progressively from one end to the other, thereby creating waves that are of interest to surfers. Prior Art A water drop wave-making apparatus includes a water reservoir apparatus, whereby water is pumped into one or more vertical tanks located at one end of a wave-pool. When full of water, rapid-action valves are opened to evacuate the stored water into the wave-pool by gravity and thus generate a wave. The two principal problems with this method are that the waves are turbulent and also the waves can only be produced at a rate of 30 to 40 per hour depending on the power and capacity of the pumps.

Another example of a surf-pool utilizes a paddle or flap which is hinged at the bottom of the pool and described in U.S. Pat. No. 4,062,192 and U.S. Pat. No. 4,976,570. Actuators are arranged to move the paddle to and from in order to generate waves. Due to the smaller volume of water displaced by the paddle, the waves produced by this method are smaller than those produced by a piston.

A second type of wave-making apparatus is typified by U.S. Pat. No. 6,716,107 and U.S. Pat. No. 5,564,859 and U.S. Pat. No. 5,171,101. A wide, thin jet of pumped water is directed horizontally against a fixed, curved profile in order to simulate a breaking wave. Though popular, a problem is that these do not behave like ocean waves and are regarded by surfers as an entirely different sport.

A third type of wave-making apparatus is described in U.S. Patent No. 2012/00 17951 A1. This apparatus moves an underwater profile on tracks along the bottom of a wave-pool. The water thus displaced forms a breaking wave. The principal problem with these pools is that because the underwater profile has to be moved back and forth along the bottom of the wave-pool, a wave repetition rate of only about 120 per hour can be achieved.

A fourth type of apparatus and method for generating waves in a body of water is revealed in US Publication 4976570 (Walter R. Davis, Todd H. Nahraup). A moveable wave-generating member is cyclically reciprocated in the body or water to make waves. A disadvantage of this device is that a chamber and a baffle positioned adjacent the wave generating member dissipates energy from the return stroke. As the dissipated energy can do no useful work, the apparatus is inefficient for producing waves.

Further methods and mechanisms for generating waves suitable for surfing such as U.S. Pat. No. 4,062,192 and U.S. Pat. No. 534,215 are known, but like the aforementioned methods and mechanisms they suffer from not being able to efficiently produce waves suitable for surfing.

Another method and mechanism for generating waves suitable for surfing such as patent WO2015082871 are known, but like the aforementioned methods and mechanisms require constructing a 90 degree concrete back wall within the surf pool. This invention also requires constructing lateral walls to create a flume for the system to operate. This system requires substantial costs to construct this system. Unlike in the current invention does not require a 90 degree back concrete wall and does not require laterally walls to create a flume. The current invention utilizes the dirt excavated from creation of the surf pool to create a 45 degree wall with minimum construction costs.

Another conventional wave generator is the surf wave generator or Water Cannons or Set Wave System. See. Carnahan, U.S. Pat. No. 5,833,393 A and Garrett Johnson, US20090038067. The Set Wave System wave generator uses compressed air to release water from caissons to form a wave. The surf wave generator uses rows of caissons positioned along a side of the pool. More specifically, the caissons of the surf wave generator are generally positioned vertically along a back side of the pool.

Another wave generator is the Surge Wave Generators of the plunger type constituted by a body having a given shape and a vertical movement immersing it more or less in the expanse of water in which surge is required to be generated, are known. One shape of plunger often used is that of a simple triangular prism with horizontal generating lines perpendicular to the direction of the surge to be generated and one of whose faces is vertical.

Another conventional wave generator is a plow that is pulled through the water by mechanical means and produces a simulated wave. The plow can be designed in different shapes, such as a conventional snow plow shape or a delta wing shape or tear drop shape. These plows can be pulled by a motor and cable system or they can be affixed to a tracking system driven by a motor or linear motor drive system. See. Odriozola Sagastume, US20100017951 A1.

Another conventional wave generator is the hydrofoil system. A plurality of hydrofoils are placed or connected as arms to a track system that moves the hydrofoil through the water to produce surfable waves. one or more foils, each foil arranged vertically along at least a major part of a the side wall and adapted for movement in a direction along a length of the side wall, each foil having a curvilinear cross-sectional geometry that defines a leading surface that is adapted to generate a wave in the water from the movement, and a trailing surface configured for flow recovery to avoid separation of the flow of water in the wave and mitigate drag from the foil from the movement; and a moving mechanism connected between the side wall and the one or more foils for moving the one or more foils in the direction along the length of the side wall to generate a surface gravity wave by each of the one or more foils. See. Slater, US20100124459 A1.

Another conventional wave generator is the mechanical piston flume wave generator design. A wave generating module for a wave-making apparatus comprising a flume which is flooded water through an open end, a back wall which blocks the flume, and a barrier constrained to move along the flume intermediate the back wall and the open end, characterized by a reciprocating means arranged to displace the barrier towards the back wall to generate a wave toward the back wall that is reflected from the back wall to assist subsequent displacement of the barrier away from the back wall in generating a wave through the open end. See. Baxendale, WO2015082871 A1.

Another conventional wave generator is an air blower generator. These air blowers come in 45 kw or 75 kw sized air blowers. Air blower generators blow air into vertical chambers forcing the water into the pool to produce the waves. These air blower wave generators are efficient, however they lack power and size of the wave.

SUMMARY OF THE INVENTION

A wave generating apparatus comprising of a plunger wave generator.

Advantages of the Current Invention:
Provide a single wave or series of waves in a surf pool or wave pool or body of water.
Allow an adjustable wave profile.
Allow adjustable shape and direction of the wave fronts.
Minimize energy needed for wave generation.
Minimize cost of hardware for the wave generator and supporting structure.
Minimize the cost and complexity of maintenance of the wave generation equipment.

The wave generator in the current invention is a plunger type. Advantages of plungers are well known, including simplicity and having the drive system mostly above water level. Typically, plungers have consisted of a wedge with a vertical back surface and a tapered or curved front surface and they have been moved up and down a vertical back wall by an actuation means. The wave is generated as the tapered front surface translates horizontally as the plunger moves vertically, displacing water. There is a practical limit to the angle of the plunger front surface, as if it is excessive the wave generated is poor form. This limits the size of the wave that can be generated for a given vertical motion. A further advantage of wedge plungers is that the back surface does not generate a wave, reducing the power needed to generate the desired wave and eliminating the need for a back wave absorbing mechanism.

In this embodiment, the plunger is guided along a sloped wall, at 45° for example. By moving on the sloped wall, the horizontal component of motion adds to the horizontally displaced water, allow a bigger wave to be generated. Further, a modest taper on the front surface increases the effective horizontal displacement due to the vertical component of the plunger motion without introducing distortions to the generated wave form. The lack of back wave is preserved, minimizing power requirements and eliminating the need for a back wave absorber.

Further, by extending the portion of the front surface that never rises above the water surface, an effective horizontal plunger surface is created, that displaces water down, which is subsequently projected forward. It's the wave travel direction near the bottom of the water column, effectively extending the wave generator area to the bottom of the pool.

Plunger Motion Drive and Control:

Typically, if a controllable and adjustable wave form is desired, the plunger motion must be controlled throughout its stroke. A servo system is often used to control the motion as a displacement profile of the plunger. The servo system can be electrically, electromechanically driven, or in a large system with big forces and power levels as required for a surfing pool, a hydraulic system is often used. Such a servo hydraulic system is well suited for controlling large forces accurately at high velocities. However one problem with a servo hydraulic system is the inefficiencies inherent in a servo valve as the flow is throttled throughout the motion.

In this system, rather than precisely controlling the position of the plunger with a servo system, an alternative is to control the natural motion of the plunger due to its buoyancy, using a hydraulic cylinder connected to hydraulic accumulators through high flow, low loss solenoid valves. The accumulators can be connected to the extending and retracting sides of the actuator to act as springs, modifying the stiffness of the system, adjusting the forces acting on the plunger throughout its stroke. By using commercial pressure hydraulics (nominally 3000p psi working pressure), the total volume of the compressed gas is minimized. By adjusting the precharge and volume of the accumulators, and timing of when the solenoid valves are operated, the natural motion of the plunger can be adjusted to create the desired wave in an efficient manner. Individual plungers may operate with different motion profiles to tailor the wave characteristics along the width of the wave front.

Further, some of the energy that is stored in some accumulators, such as an accumulator that is compressed when stopping the up stroke, can be saved and provide an energy advantage as a source for recharging the drive accumulator for subsequent waves.

It is also advantageous to configure the plunger and guide such that the natural frequency of the plunger mass floating in the water closely matched the period of the desired wave. This minimizes the force and power to operate the system. The natural frequency of the plunger can be adjusted by adding mass with ballast water.

Wave Front Shape and Direction:

The wave front is generated with a series of plungers in a linear array. If all of the plungers are moved simultaneously, a straight wave front is produced that moves perpendicular to the plungers towards the reef. By adjusting the phase of the individual plungers, the generated wave can be steered to different angles on to each side of the reef, curved to send the end of the waves into the side reefs, or to concentrate wave energy anywhere along the length of the wave crest.

In order that the invention may be more fully understood and put into practice, a preferred embodiment thereof now will be described with reference to the accompanied drawings.

DETAILED DESCRIPTION OF THE DRAWINGS

Before any aspect of the invention are explained in detail, it should be understood that the invention is not limited to its application in the details of construction and the arrangement of components set forth in the following description or shown in the following drawings. The invention is capable of other aspects and of being practiced or of being carried out in various ways. Also, it should be understood that the phraseology and terminology used herein is for the purpose of description and should and should not be regarded as limited.

Before any aspects of the invention are explained in detail, it is to be understood that the invention is not limited in its application to the details of construction and the arrangement of components set forth in the following description or shown in the following drawings. The invention is capable of other aspects and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

As used herein, the term surfing is defined to include bodysurfing, board surfing, sail boarding, wake boarding and any other recreational activity that requires waves. Thus, the present invention is useful for a variety of surf related activities, and the terms "surf" or "surfer" or "surfing" should be construed as meaning any surf related activity and its participants.

Figure 1:
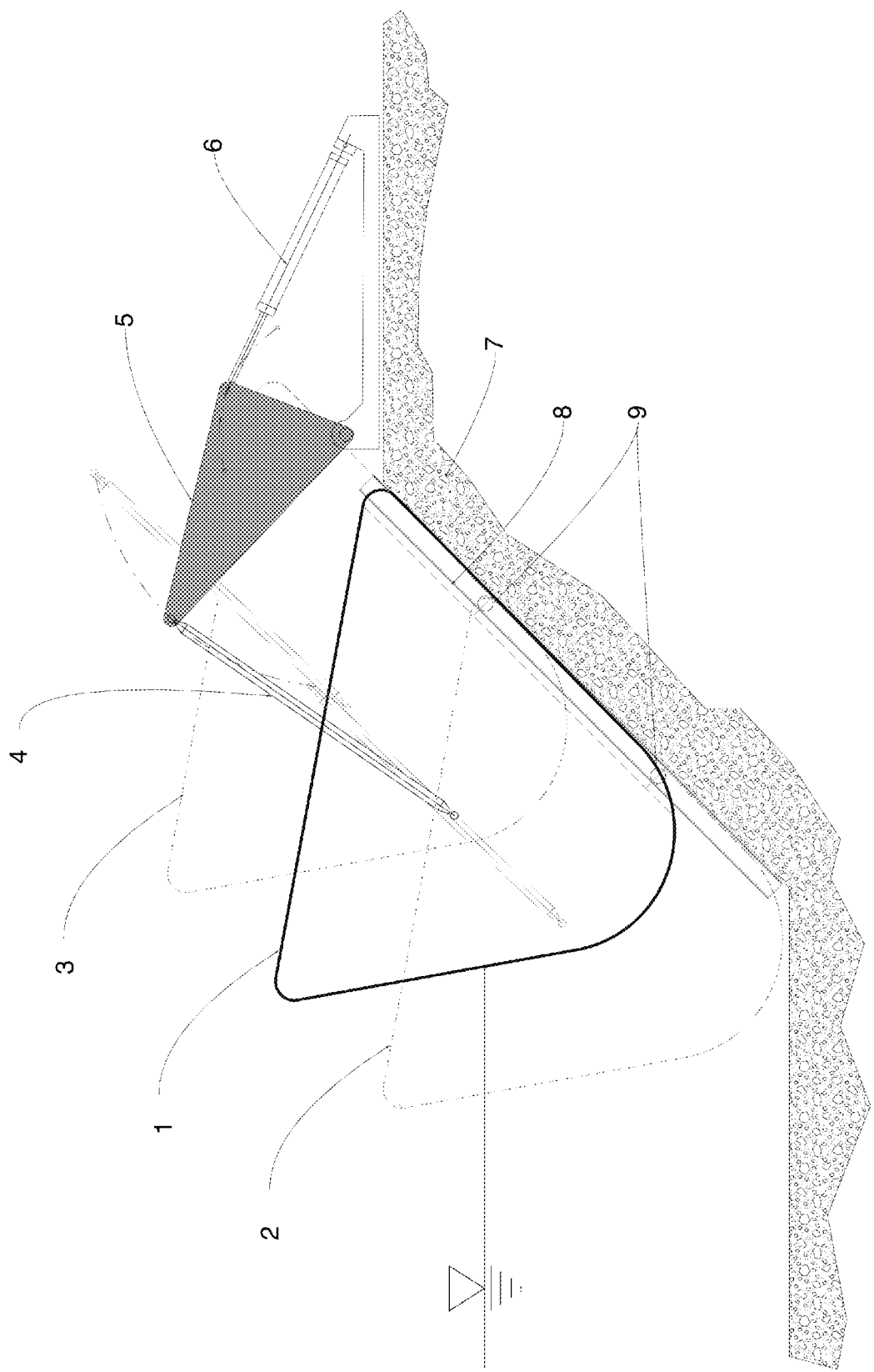
FIG. 1 A side view illustration of one embodiment of the plunger wave generator according to the present invention.

Description of FIG. 1.

Figure 6:
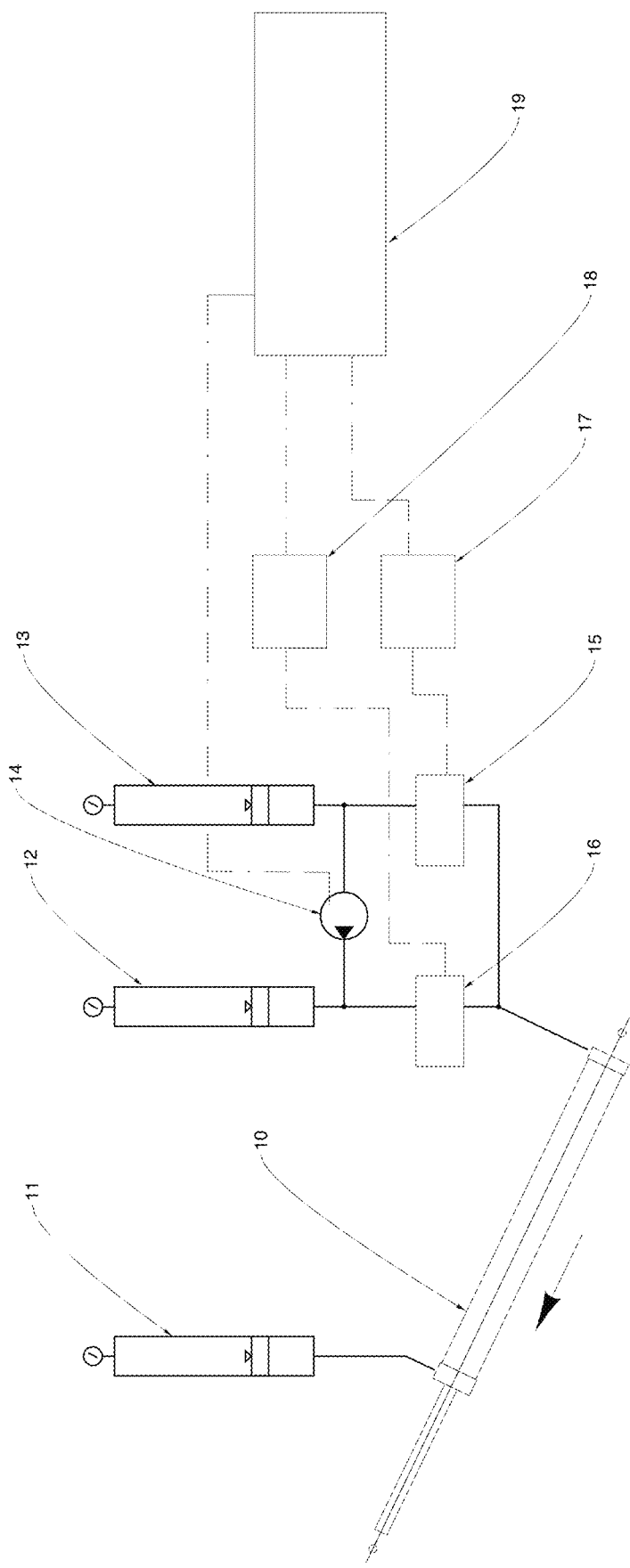
FIG. 6. A side view of a hydraulic actuator system.

Plunger (1) is shown at the middle of its stroke range. It's position along the guide rails (8) is constrained by guide rollers (9) to linear travel along the angled slope of the body of water, and is driven along that length by an actuator (6) either directly or through a mechanism such as shown here as a belcrank (5) and link (4) such that it's position can range from fully down (2) and fully up (3). An actuator (6) is controlled by a system as shown in FIG. 6.

Figure 2:
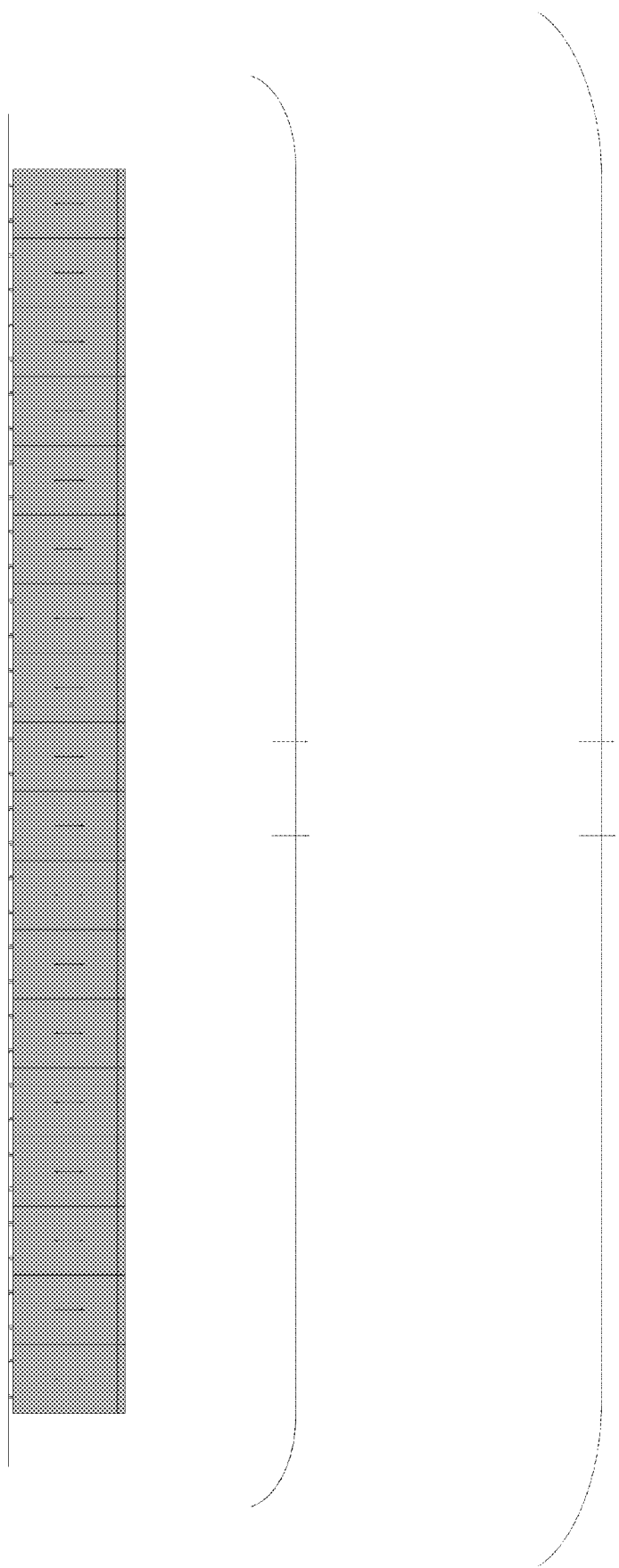
FIG. 2 A top view illustration of the plungers.

Description of FIG. 2. Top view of the plungers aligned in a linear fashion. The plungers are producing a straight wave crest.

Figure 3:
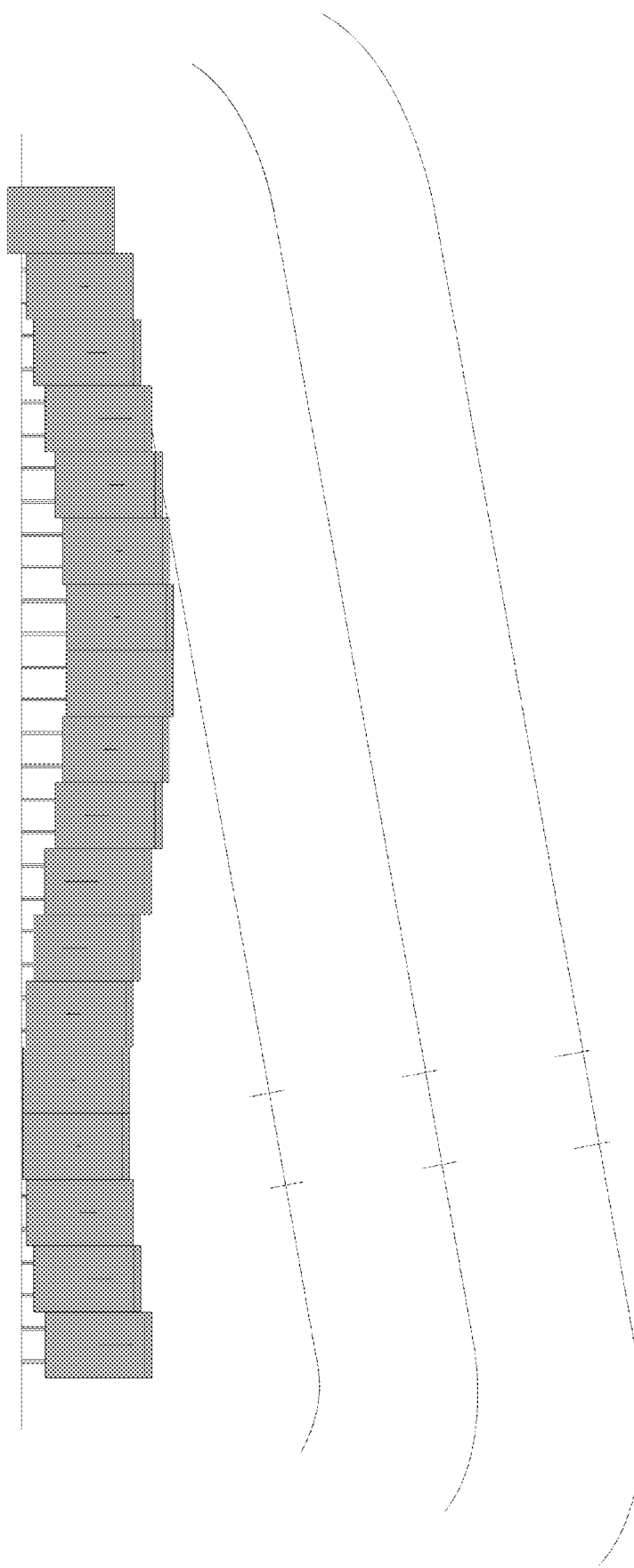
FIG. 3 A top view of plungers in different timed sequence with angled wave.

Description of FIG. 3. Top view of the plungers aligned in a linear fashion with different timed sequence. The plungers are producing an angled wave crest.

Figure 4:
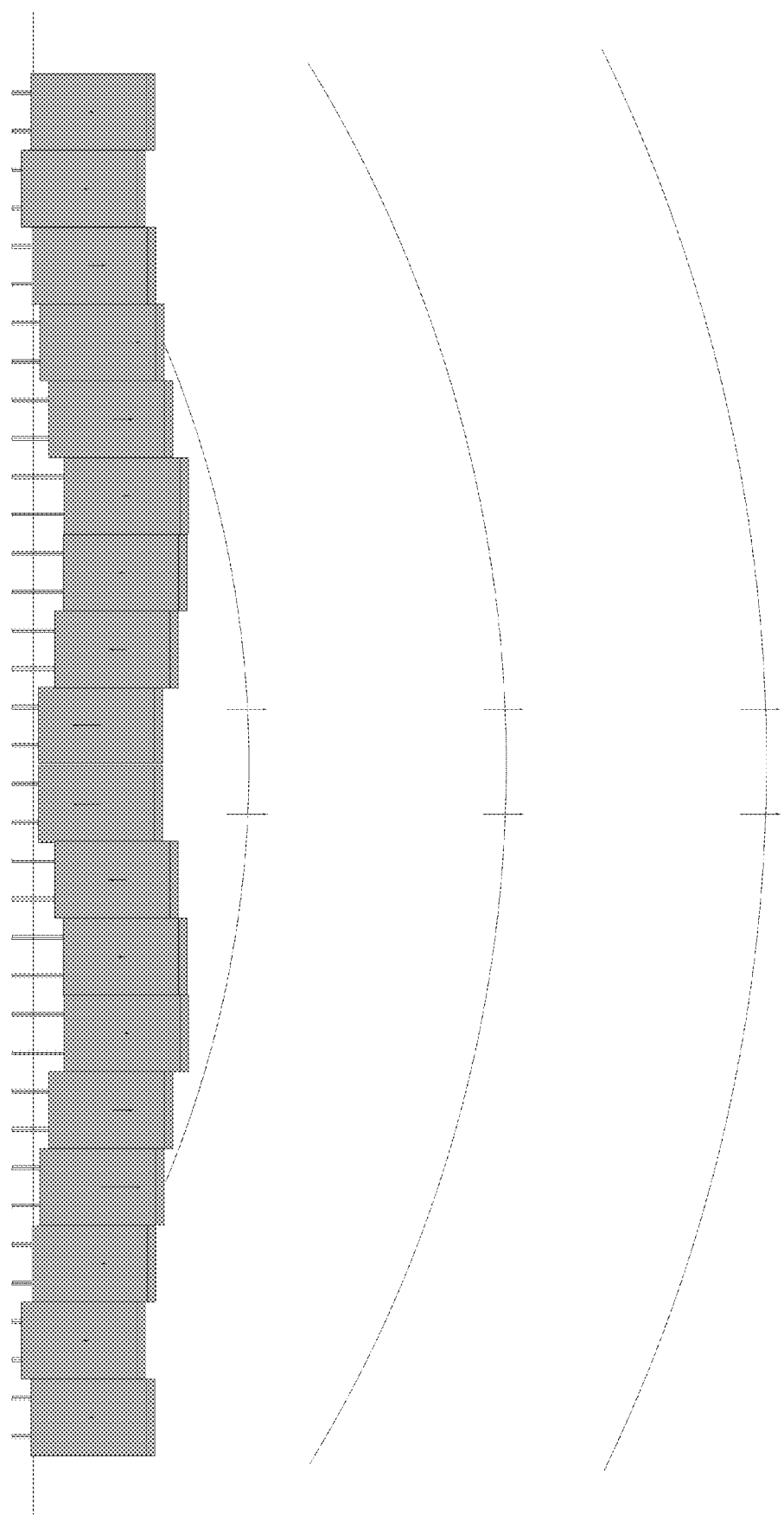
FIG. 4 A top view of plungers in different timed sequence with diverging wave.

Description of FIG. 4. Top view of the plungers aligned in a linear fashion with different timed sequence. The plungers are producing a diverging wave crest.

Figure 5:
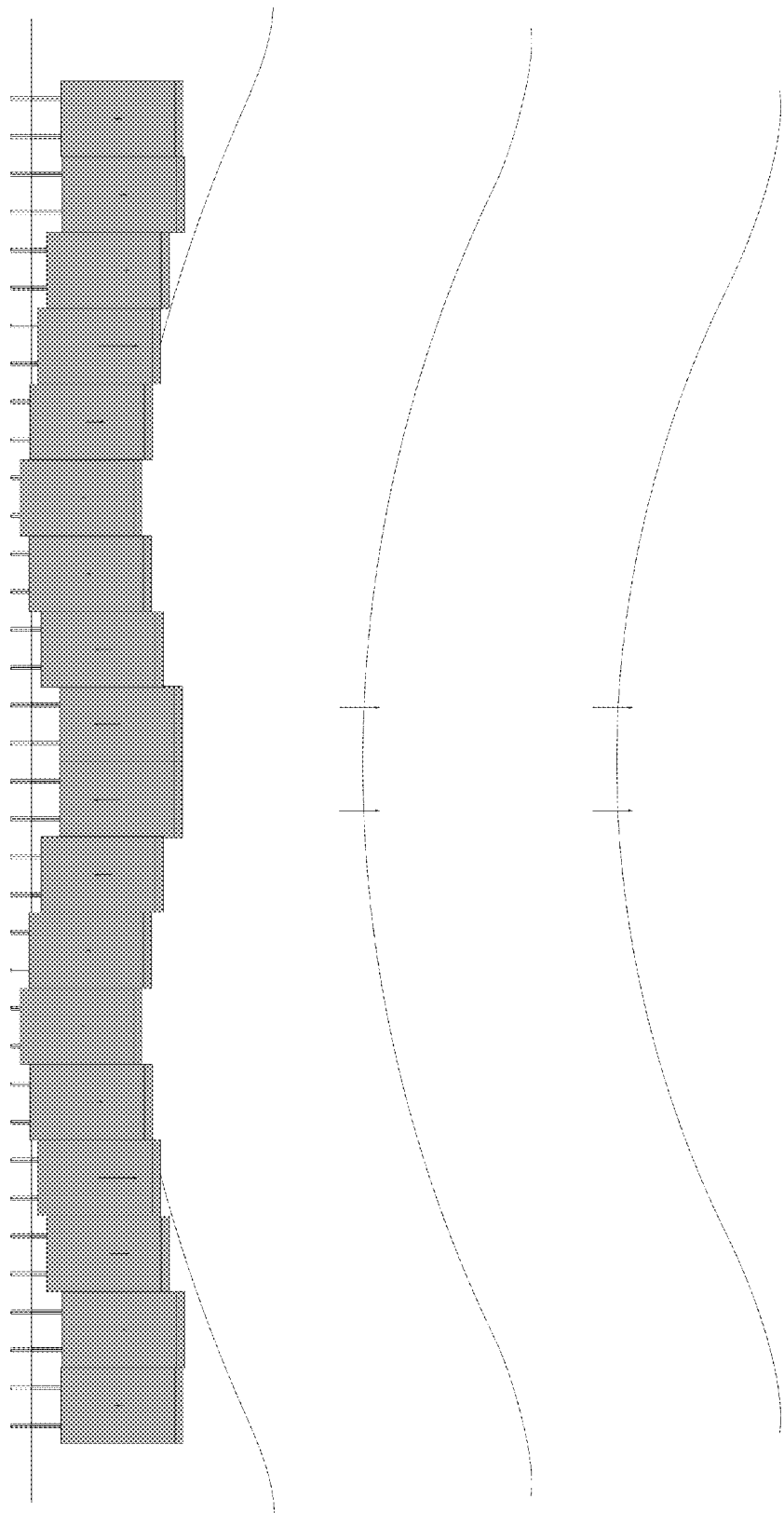
FIG. 5 A top view of plungers in different timed sequence with converging wave.

Description of FIG. 5. Top view of the plungers aligned in a linear fashion with different timed sequence. The plungers are producing a converging wave crest.

Description of FIG. 6.

Hydraulic pressure in the retract and extend ports of actuator (10) supplied by a hydraulic circuit as shown. Hydraulic accumulator (11) is connected such that it acts as an adjustable pneumatic spring with the spring rate and force determined by the pressure and volume of the nitrogen section. The force due to the pressure is additive to the buoyancy of the plunger in driving the plunger upward. To allow the plunger to rise, the high flow valve (15) is opened using pilot valve (17) to allow flow out of the extension end of actuator (10) and into accumulator (13), which has sufficiently low precharge pressure and volume to also the plunger to rise. Near the full up position, the pressure in accumulator will rise and in conjunction with the reduced buoyancy the upward motion of the will be halted. At the full up position, valve (15) can be closed, and the plunger held for an adjustable time before valve (16) is commanded open by the controller (19) by means of pilot valve (18). The precharge pressure, hydraulic fluid volume and pressure in accumulator (12) is applied to the actuator (10) as a force, which along with the weight of the plunger forces the plunger down the rails and producing a wave. Energy for the subsequent wave is provided by the hydraulic pump (14), which uses the trapped residual hydraulic pressure of the previous wave in accumulator (13) as a source. Adjustments of precharges in all accumulators and timing of valves can be used to alter the characteristics of the generated wave.

Figure 7:
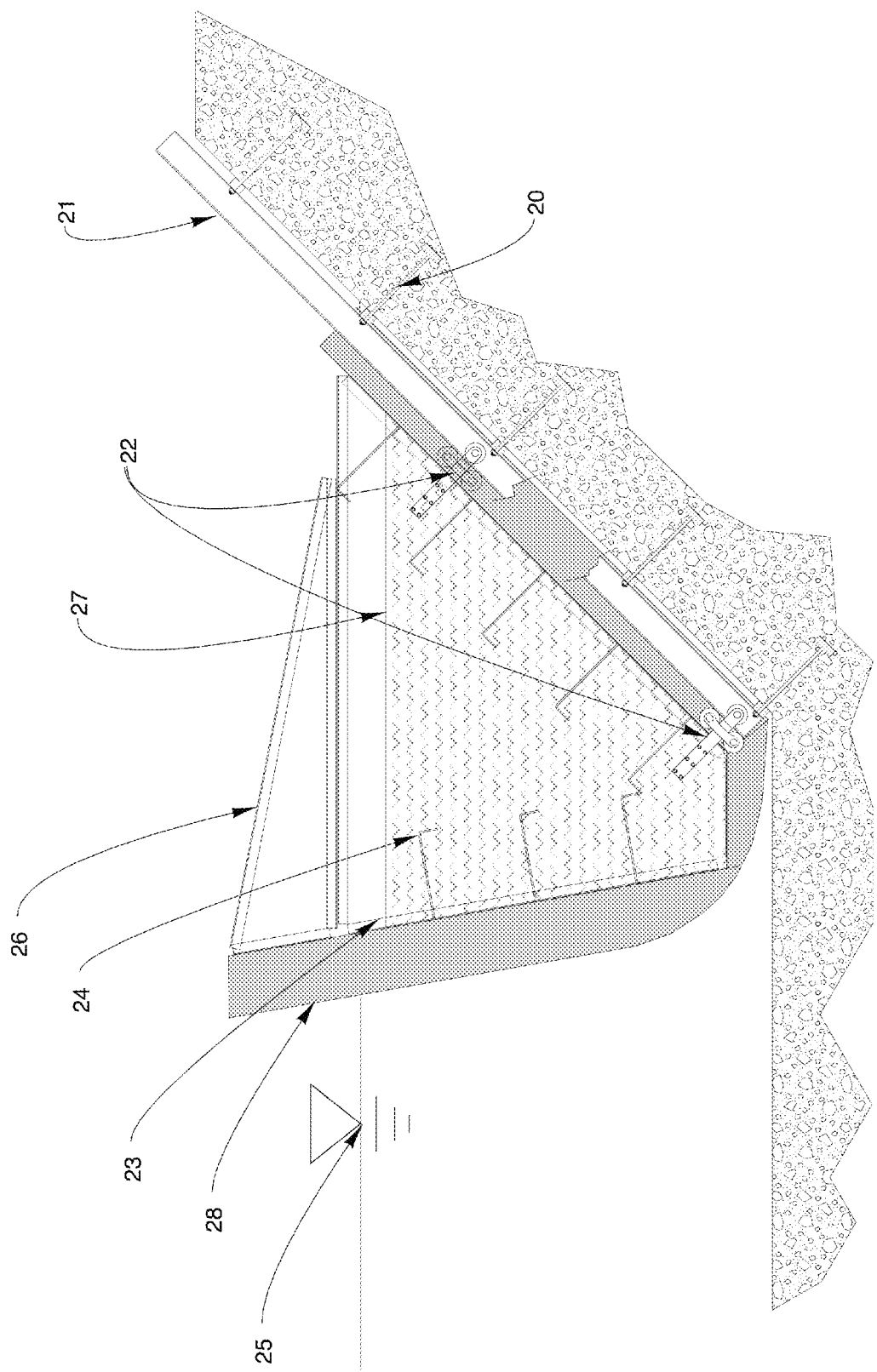
FIG. 7. Cross Section View of Plunger Assembly.

Description of FIG. 7:

FIG. 7 shows a cross section of the plunger in the full down position. Guide rails (21) are anchored in place on the slope of the pool structure using anchor bolts (20). Wheel assemblies (22) are used to guide the plunger assembly up and down along the slope of the guide rails. The moving assembly additionally is comprised of a frame (23) that forms a substantially enclosed volume made of frame members and steel sheets, as well as stiffening elements (24) which resist water pressure and damp water sloshing when the system is moving. An upper frame, (26) extends the structure above the still water level (25) of the pool. Water is admitted to the internal volume of the plunger assembly to a level (27) that can be adjusted to an optimal value in counteracting the buoyancy of the overall assembly. Buoyancy is provided, and the desired external shape of the plunger assembly formed, by a layer of structural foam (28) attached to all sides of the plunger.

The invention claimed is:

1. A wave-making apparatus for generating waves in a body of water comprising:

A plurality of wave generating plungers;

Reciprocating means arranged to displace the wave generating plungers vertically forward and then backward to generate a wave in the body of water;

Guide rails on each side of each of the wave generating plungers;

A belcrank and a link in each of the wave generating plungers;

Hydraulic actuators that are controlled by a computer system;

Wherein each of the wave generator plungers has a blunt bottom;

Wherein each of the wave generating plungers is hollow and contain water ballast;

Wherein the wave generating plungers are pushed up and down to the bottom of the body of water;

Wherein the wave generating plungers function in an upward and downward motion;

Wherein the hydraulic actuators that power the wave generating plungers contain hydraulic pressure;

A hydraulic power unit, which is comprised of the hydraulic actuators, hydraulic accumulators, hydraulic high flow valves, pilot valves and retract and extend ports of the hydraulic actuators;

Wherein the hydraulic accumulators function with an adjustable pneumatic spring and an adjustable spring rate;

Wherein the wave generating plungers contain a steel frame unit;

Wherein the wave generating plungers start in a downward position at the bottom of the body of water and then rise to a full up position, then all the way back down to the bottom of the body of water;

Wherein the reciprocating means functions by the hydraulic actuators connected to the belcrank;

Wherein the hydraulic actuators push or pull the belcrank, connected to the link, the link connected to the wave generating plungers;

Wherein the belcrank and link when actuated by the hydraulic actuators cause the wave generating plungers to go up and down and function as a complete operative device to push a surfable wave into the body of water;

Guide rollers constrained by the guide rails located on each side of the wave generating plungers;

Wherein the guide rollers slide in the guide rails to allow the upward and downward motion of the wave generating plungers;

Wherein the hydraulic power system consists of the retract and extend ports of the hydraulic actuators and a hydraulic circuit;

Wherein the force due to the hydraulic pressure alongside the buoyancy of the wave generating plungers drive the wave generating plungers upward, to allow the wave generating plunger to rise;

Wherein the high flow valve is opened using the pilot valve to allow flow out of the extend port of the hydraulic actuators;

Wherein the hydraulic actuators have sufficiently low precharge pressure and volume to cause the wave generating plungers to rise, near the full up position, the pressure in the hydraulic accumulators will rise and in conjunction with the reduced buoyancy the upward motion of the wave generating plungers will be halted;

Wherein the high flow valve can be closed for an adjustable time before the high flow valve is opened by a controller by means of the pilot valve;

Wherein precharge pressure, hydraulic fluid volume and pressure in the hydraulic accumulator is applied to the hydraulic actuator which along with a weight of the wave generating plungers forces the wave generating plungers down the guide rails thereby producing the wave;

A hydraulic pump, which uses residual hydraulic pressure in the hydraulic accumulator as a power source;

Wherein the guide rollers are driven along the guide rails by the hydraulic actuators, the belcrank and the link;

Wherein the wave generating plungers are placed on a slope and have a front surface angle.

2. The wave generating plungers as recited in claim 1, wherein the slope is between 30 to 80 degrees.

3. The wave generating plungers as recited in claim 1, wherein the front surface angle is from 10 to 40 degrees.

4. The wave generating plungers as recited in claim 1, wherein the blunt bottom of each of the wave generating plungers increase displacement and generate water motion in an area below the wave generating plungers.

5. The wave generating plungers as recited in claim 1, wherein the wave generating plungers move in a motion parallel to and close to a sloped wall to minimize back wave generation.

6. The wave generating plungers as recited in claim 1, wherein the wave generating plungers are driven to the bottom of the body of water, released to the full up position and then driven down to generate a surfable wave.

7. The wave generating plungers as recited in claim 1, wherein a motion of the wave generating plungers is controlled with a hydraulic actuator force, wherein gravity buoyancy force assists the wave generating plungers in the upward motion and ballast weight force of wave generating plungers assists the wave.

8. The wave generating plungers as recited in claim 1, wherein the hydraulic actuators, belcrank and link can capture and reuse energy used to controllably decelerate a motion of the wave generating plungers, wherein hydraulic pressure in the hydraulic accumulators is used as a source of hydraulic oil for the hydraulic pump to recharge the hydraulic accumulators, wherein energy is absorbed by the mechanism, wherein energy from a motion of the wave generating plungers can be recovered to minimize operating energy.

9. The wave generating plungers as recited in claim 1, wherein a buoyancy of the wave generating plungers can by varied by varying the water ballast.

10. The wave generating plungers as recited in claim 1, wherein a wave front shape and direction is controlled by phased timing of operation of a linear arrangement of wave generating plungers.

11. The wave generating plungers as recited in claim 1, wherein the wave generating plungers move forward and retract backward on a tracking system, wherein the guide rails are bolted on cement footings and a guide wheel assembly runs within the guide rails.

12. The wave generating plungers as recited in claim 1, wherein the wave generating plungers are made of a buoyant structural foam, wherein the wave generating plungers attach to a lower steel frame, and an upper steel frame attaches to an upper portion of the wave generating plungers.

13. The wave generating plungers as recited in claim 1, wherein the wave generating plungers are supported solely by the hydraulic actuators, belcrank and link.

* * * * *